No. 809,537. PATENTED JAN. 9, 1906.
F. H. STERLING.
TIRE FOR WHEELED VEHICLES.
APPLICATION FILED DEC. 6, 1904.
2 SHEETS—SHEET 2.
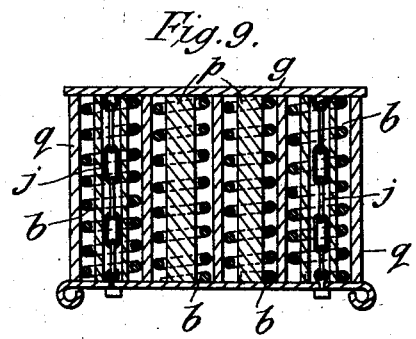
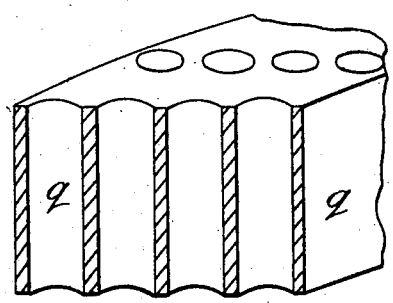
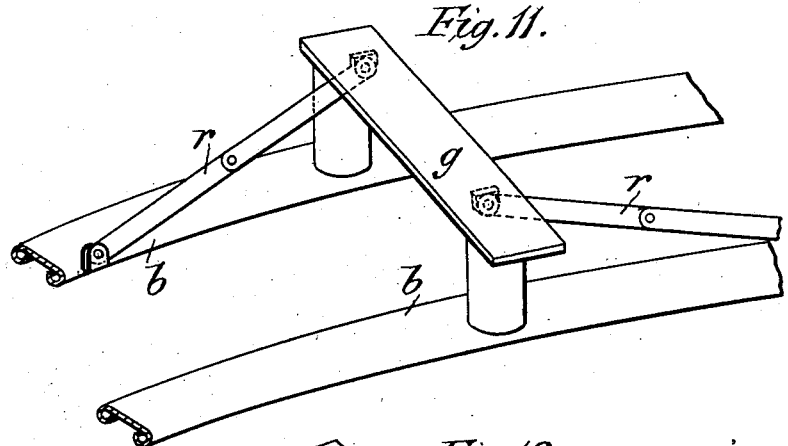
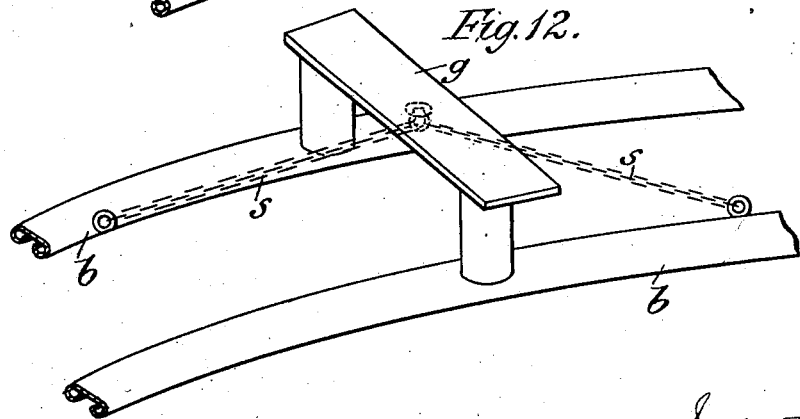
Witnesses:
Walter Allen
L. B. Middleton
Inventor
Frank H. Sterling.
by Herbert W. T. Jenner.
Attorney.

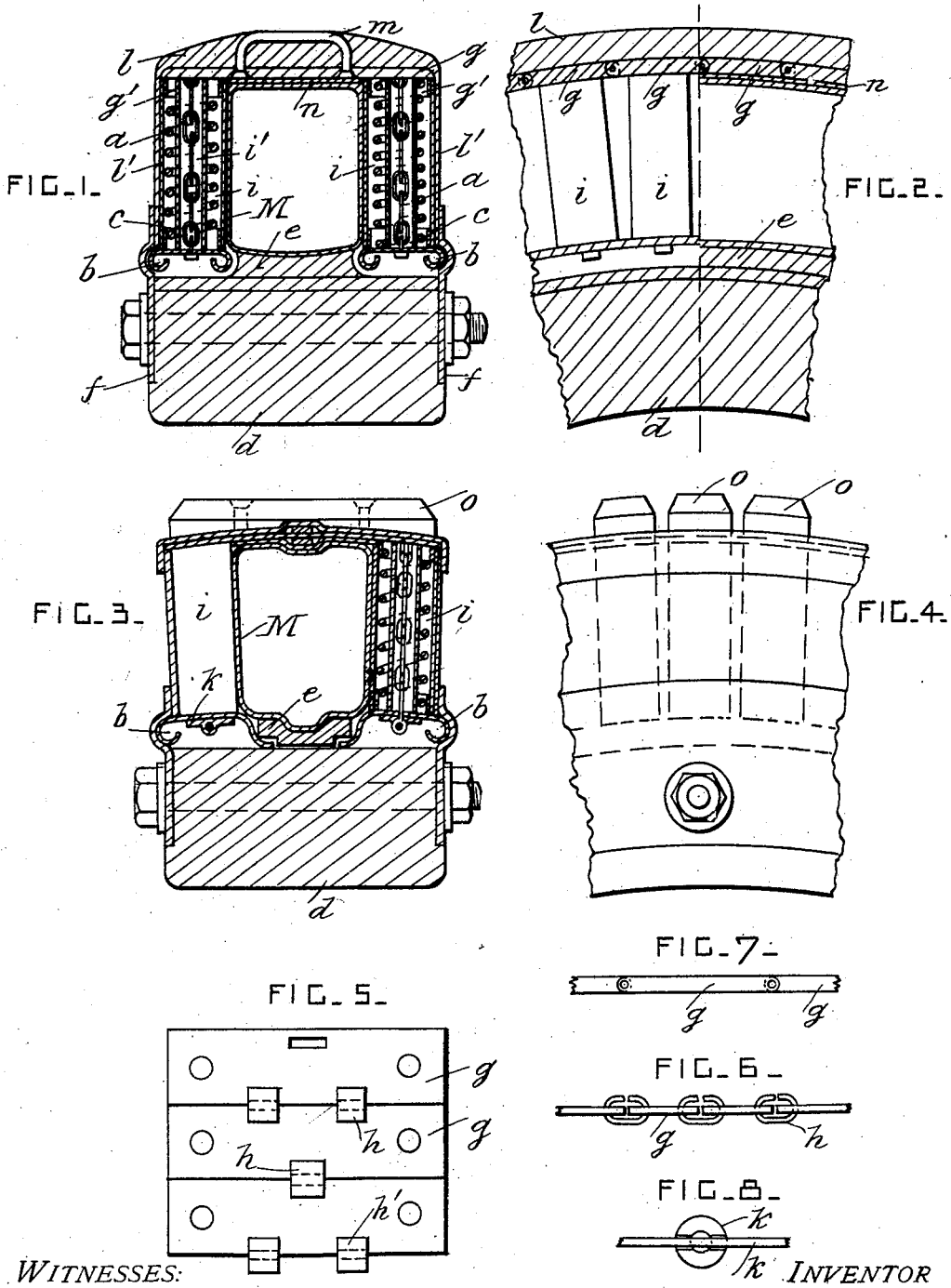

UNITED STATES PATENT OFFICE.

FRANK HENRY STERLING, OF LONDON, ENGLAND.

TIRE FOR WHEELED VEHICLES.

No. 809,537.

Specification of Letters Patent.

Patented Jan. 9, 1906.

Application filed December 6, 1904. Serial No. 235,755.

*To all whom it may concern:*

Be it known that I, FRANK HENRY STERLING, residing at 61 Spencer street, London, E. C., England, have invented certain new and useful Improvements in Tires for Wheeled Vehicles; and I do hereby declare the following to be a full, clear, and exact description of the invention, such as will enable others skilled in the art to which it appertains to make and use the same.

This invention relates to improvements in tires for wheeled vehicles, the object being to provide a resilient and efficient spring or combined spring and pneumatic tire particularly adapted for use in connection with heavy vehicles.

This invention consists, essentially, in mounting upon the rim or felly two or more rows of spiral springs, running around the outer circumference of the rim or felly, and in connecting the transverse rows of springs thus formed together by means of bridge-pieces, which in turn are flexibly connected together circumferentially around the tire, so as to form a flexible suspension rim or tread, while the springs may have rubber cores, with restraining links or members passing therethrough, and likewise be coated upon their outer surfaces with rubber or be provided with rubber sleeves.

The tire may consist of circumferential rows of springs transversely connected by bridge-pieces, which in turn are circumferentially connected together, or it may consist of two or more rows arranged at the sides of the rims or felly so as to leave an annular space for containing the inflatable air-chamber.

In order that this invention may be more fully understood, it will now be described with reference to the accompanying drawings, in which—

Figure 1 is a cross-section of a tire constructed according to this invention. Fig. 2 is a partial side elevation and longitudinal section of such a tire. Fig. 3 is a cross-section of a slightly-modified form of the tire. Fig. 4 is a partial side elevation thereof. Fig. 5 is a plan of some of the bridge-pieces, showing a method of flexibly connecting them together. Fig. 6 is a side view of Fig. 5. Fig. 7 is a detailed view of an alternative method of flexibly connecting the bridge-pieces. Fig. 8 is a detailed view hereinafter referred to. Fig. 9 is a cross-section of a tire formed wholly of springs. Fig. 10 is a detailed view of a modified form of spring-casing hereinafter referred to. Figs. 11 and 12 are diagrammatic views showing the means which may be employed for preventing circumferential or combined circumferential and lateral movement of the springs, as hereinafter described.

In carrying this invention into practical effect and according to one form of construction the tire comprises two circumferential rows of springs $a$, mounted upon two endless bands or rings $b$, which may be formed with circular flanges or nipples $c$ passing over the lower extremities of the springs. The bands $b$ are mounted upon a rim or felly $d$ and are slid into position from one side, a ring or band $e$ being arranged between them and serving as an annular distance-piece, while they are secured in position by side flanges $f$, bolted or otherwise suitably secured to the rim or felly $d$.

The circumferential rows of springs $a$ are transversely secured together by a number of bridge-pieces $g$ connecting each opposed pair of springs, the said bridge-pieces being formed with circular flanges or nipples $g'$ embracing the upper extremities of the springs, and these bridge-pieces are flexibly connected together, which may be effected, as shown at Figs. 5 and 6, by connecting the plates $g$ by small links or clips $h$, or the plates $g$ may be simply connected together after the manner of the ordinary hinge, as shown at Fig. 7.

Each spring is inclosed in a rubber sleeve $i$, while through the center of the spring a rubber core $i'$, containing a collapsible restraining-chain, passes, the upper extremity of each chain being connected with one of the bridge-pieces and its lower extremity with the band or ring $b$, and this may be effected by passing the lower extremity through the band and then passing a pin or ring through the end link, or the end of the chain may be passed through the washer $k$, such as shown in Fig. 8, and the extremities of such a number of restraining-chains may then be secured by passing a wire, such as $k'$, through the end links, the wire lying in slots formed in the faces of the washers, Fig. 8.

The restraining medium need not necessarily take the form of a chain, but may be a wire or other suitable member arranged so as to be capable of sufficiently collapsing when the springs are compressed by the weight of the vehicle, and in all cases these restraining chains, wires, or the like would preferably normally retain the springs slightly compressed and prevent their further expansion.

In the form shown in Figs. 1 and 2 the tire is furnished with a tread $l$, formed of rubber, rubber and canvas, or other material suitable for the purpose, which is formed with side strips $l'$ extending down the sides of the tire and secured under the side flanges $f$, while to prevent the tread from "creeping" staples, such as $m$, may be passed therethrough at suitable intervals and riveted to the bridge-pieces $g$.

The central annular space between the two circumferential rows of springs is employed to contain an air-tube M, while between the top of the air-tube and the inner surfaces of the bridge-pieces a strip or band $n$ of rubber, canvas, felt, or other suitable material is placed for protecting the said tube, and where the springs are not provided with outer sleeves this band may extend down the sides of the springs, so as to partially inclose and protect the air-tube.

The form shown at Figs. 3 and 4 differs but slightly from that already described—that is to say, the inner edges of the bands $b$ assume a different form, as shown, while the annular distance-piece $e$ is correspondingly shaped, and the tread takes the forms of blocks $o$ of metal or other suitable material, which are riveted to the bridge-pieces, and these blocks are not necessarily of the form shown, but may be of any suitable shape and form and of any suitable form in cross-section.

Instead of a single circumferential row of springs being employed at each side of the air-chamber, two or more such rows may be employed within practical limits; but in all cases the transverse rows of springs would be connected together by bridge-pieces, which in turn would be flexibly connected together circumferentially around the tire, and where a number of circumferential rows of springs are employed restraining-chains or the like need not be employed in connection with the whole of them. For instance, they may pass through the end springs only of each transverse row, the intermediate springs being filled with the solid cores of rubber, or where a tire is constructed entirely of a number of circumferential rows the end springs of each transverse row only may be secured to the bridge-pieces and some or all of the intermediate springs abut against the bridge-piece.

Fig. 9 shows a tire constructed of four circumferential rows of springs $b$, the outer springs of each transverse row only being connected with the bridge-pieces $g$ and provided with restraining-chains $j$ or the like, the intermediate springs being filled with solid cores of rubber $p$, and in a tire of this form the separate outer rubber sleeves may be dispensed with and replaced by a band $q$, Fig. 10, of sufficient depth and formed either as a complete ring or circle or in sections, which is provided with the requisite number of holes or perforations to contain the springs, and it is obvious that a tire in this form might be constructed with any number of circumferential rows of springs within practical limits.

Fig. 11 diagrammatically illustrates a method of preventing circumferential movement of the springs, and to this end a hinged link or toggle arm $r$ is pivoted to one of the side bands $b$ and at its upper extremity to one of the bridge-pieces $g$, a corresponding link or toggle arm running from the same or another bridge-piece in the opposite direction and being secured to the band $b$ on the opposite side. These links or toggle-arms may be secured outside the tire when they cannot be conveniently arranged within the same, or where an air-tube is employed they may be arranged between the side springs and the air-tube, the latter being suitably protected, or where there is an annular space between the circumferential rows of rings not occupied by an air-tube they may be arranged within the space.

Fig. 12 shows a slightly-modified arrangement wherein a chain is employed and arranged in an annular space between the circumferential rows of springs, and in this arrangement the chain $s$ is secured to the band $b$ at one side, is carried up in a slanting direction and secured to approximately the center of one of the bridge-pieces, and then carried down in the opposite direction and secured to the band at the opposite side, or chains or the like may be employed and arranged in the manner hereinbefore described with reference to Fig. 11.

The rows of springs may be arranged parallel to each other or they may be inclined to or from the felly or slightly curved, as required, while instead of circular flanges or nipples being formed on or secured to the side bands $b$ the latter may contain a series of holes or perforations through which separately-formed nipples may be passed to engage the ends of the springs, and the same arrangement applies to the connecting bridge-pieces, while where the outer rubber sleeves are dispensed with, which are normally drawn over and grip the circular flanges or nipples, the latter may have their extremities slightly turned or passed in an inward direction, so as to securely grip the springs, or the nipples may be screw-threaded and the ends of the springs adapted to screw therein. Where double clips, such as $h$, Fig. 5, are employed for connecting the bridge-plates $g$, they may be formed integrally with a common base or uniting-plate, such as $h'$, which forms a cover for protecting the joint.

Having now described my invention, what

I claim as new, and desire to secure by Letters Patent, is—

1. The combination, with a wheel-rim, of spiral springs secured around the said rim, bridge-pieces arranged around the said springs, pivotal connections between the adjacent ends of the said bridge-pieces, and flexible connections arranged radially between the said wheel-rim and bridge-pieces and limiting the outward movements of the said bridge-pieces.

2. The combination, with a wheel-rim, of rows of spiral springs secured around the said rim, bridge-pieces bearing directly upon and secured to the outer end portions of the said springs, and links pivotally connecting the adjacent edges of the said bridge-pieces.

3. The combination, with a wheel-rim, of rows of spiral springs secured around the said rim, a series of articulated bridge-pieces connected to the outer end portions of the said springs, and a series of flexible connections arranged radially between the said rim and bridge-pieces.

4. The combination, with a wheel-rim, of rows of spiral springs secured around the said rim, a series of articulated bridge-pieces connected to the outer end portions of the said springs, and cores of elastic material arranged inside the said springs.

5. The combination, with a wheel-rim, of rows of spiral springs secured around the said rim, a series of articulated bridge-pieces connected to the outer end portions of the said springs, tubular cores of elastic material arranged inside the said springs, and flexible connections arranged radially between the said rim and bridge-pieces inside the said tubular cores.

6. The combination, with a wheel-rim, of a ring secured to the middle portion of the said rim, retaining-plates secured to the sides of the said rim, endless rings secured between the said ring and plates, rows of spiral springs having their inner end portions secured to the said endless rings, and a series of articulated bridge-pieces connected to the outer end portions of the said springs.

7. The combination, with a wheel-rim, of rows of spiral springs secured around the edges of the said rim, a series of articulated bridge-pieces connected to the outer end portions of the said springs, and an inflatable air-tube arranged at the middle part of the said rim between the said rows of springs.

8. The combination, with a wheel-rim, of rows of spiral springs secured around the said rim, a series of articulated bridge-pieces connected to the outer end portions of the said springs, and flexible connections arranged in inclined positions between the said rim and bridge-pieces and preventing the outer portions of the said springs from moving circumferentially of the said rim.

In testimony whereof I affix my signature in presence of two witnesses.

FRANK HENRY STERLING.

Witnesses:
A. M. FORMAN,
GODFREY B. SHEPHERD.